United States Patent [19]

Flotow

[11] Patent Number: 4,946,017
[45] Date of Patent: Aug. 7, 1990

[54] ANGLED RELEASE CLUTCH SYSTEM

[75] Inventor: Richard A. Flotow, Butler, Ind.

[73] Assignee: Dana Corporation, Toledo, Ohio

[21] Appl. No.: 285,153

[22] Filed: Dec. 16, 1988

[51] Int. Cl.$^5$ .............................................. F16D 19/00
[52] U.S. Cl. .................................. 192/70.3; 192/89 B; 192/99 A
[58] Field of Search ................... 192/70.3, 99 A, 89 B, 192/70.17, 98

[56] References Cited

U.S. PATENT DOCUMENTS

| | | | |
|---|---|---|---|
| 1,700,860 | 2/1929 | Snell | 192/70.14 |
| 2,004,291 | 6/1935 | Meyer | 192/52 |
| 2,010,181 | 8/1935 | Fink | 192/52 |
| 2,045,557 | 6/1936 | Almen et al. | 192/105 C |
| 2,171,908 | 9/1939 | Beringer | 192/70.18 |
| 2,239,968 | 4/1941 | Meech | 192/70.3 |
| 3,167,162 | 1/1965 | Cook | 192/89 B |
| 3,337,016 | 8/1967 | Mancher | 192/70.3 |
| 3,392,812 | 7/1968 | Kaptur et al. | 192/99 R |
| 3,707,211 | 12/1972 | Kuno | 192/113 A |
| 3,770,088 | 11/1973 | Shono | 192/70.27 |
| 3,939,951 | 2/1976 | Sink et al. | 192/89 B |
| 4,131,187 | 12/1978 | Smith et al. | 192/99 A |
| 4,503,959 | 3/1985 | Flowtow et al. | 192/70.3 |
| 4,579,210 | 4/1986 | Meyer et al. | 192/89 B |

Primary Examiner—Randolph A. Reese
Assistant Examiner—Arlen L. Olsen
Attorney, Agent, or Firm—F. B. McDonald

[57] ABSTRACT

An angled release clutch system provides a low bearing load at a relative constant pressure plate load throughout the life of either a pull-type or a push-type clutch. In a preferred form, the angled release clutch system includes an inverse Belleville spring compressed between a clutch cover and a plurality of levers for biasing the levers against the pressure plate for engagement of a friction disc secured to an input shaft. The spring includes an inner annular edge portion engageable with the levers, in an outer annular edge portion engageable with the cover, which is inverse to the normal Belleville spring clutch arrangement. The pressure plate in the preferred form includes an annular inclined surface portion for the cooperating with the levers, each lever having a pressure plate contacting portion for engaging the inclined surface portion of the pressure plate.

7 Claims, 2 Drawing Sheets

ANGLED RELEASE CLUTCH SYSTEM

BACKGROUND OF THE INVENTION

This invention relates to clutch systems of the type incorporating a Belleville spring compressed between a cover and a plurality of levers for biasing the levers into engagement with a pressure plate. More particularly, this invention relates to means for improving the operability of the clutch during its useful life, including providing a relatively constant pressure plate load throughout the life of the clutch.

The clutch art is a constantly changing, dynamic area. In the friction disc clutch area, numerous improvements have been made to provide effective clutch designs in smaller packages, while at the same time offering more wear capabilities and improved pressure plate-clutch lever interfacing.

In the latter area, most efforts have been directed to providing greater decrease in amounts of lever travel for effecting a given pressure plate movement. The problem is particularly exacerbated by clutch disc lining wear which, of course, occurs over the useful life of the clutch. Any improvement which will be effective to decrease lever travel for a given amount of pressure plate movement will enable the use of thicker linings for potentially longer life of the linings.

SUMMARY OF THE INVENTION

The invention disclosed herein provides a smaller package clutch, and at the same time, offers greater wear capabilities along with an improved pressure plate-lever interface. In a preferred form, the clutch incorporates an angled release system which provides a novel lever-to-pressure plate contact method which is effective in both pull and push types of friction disc clutches. The combination of an angled pressure plate-lever contact system and an inverse angle ring Belleville operates to provide one of the most efficient clutches yet achieved, particularly in terms of low pressure plate loadings vis-a-vis release bearing force requirements, and at the same time offers a relatively constant pressure plate load throughout the life of the clutch. As a result, the clutch provides an improved featherability of engagement, and decreases the travel of the clutch levers. This permits the use of a thicker clutch friction lining, and thus provides a longer useful life for the clutch.

In a preferred form, the angled release clutch system is incorporated in a friction disc clutch which includes an annular Belleville spring having an inner annular edge portion engageable with a plurality of levers, and an outer annular edge portion engageable with a clutch cover, thus providing an inverse Belleville spring system. The pressure plate of the presently preferred embodiment includes an annular inclined surface portion for improving lever effectiveness, and provides a system structure which lends itself to utilization in both push and pull-type clutches.

DETAILED DESCRIPTION OF PREFERRED EMBODIMENTS

Figure 1:
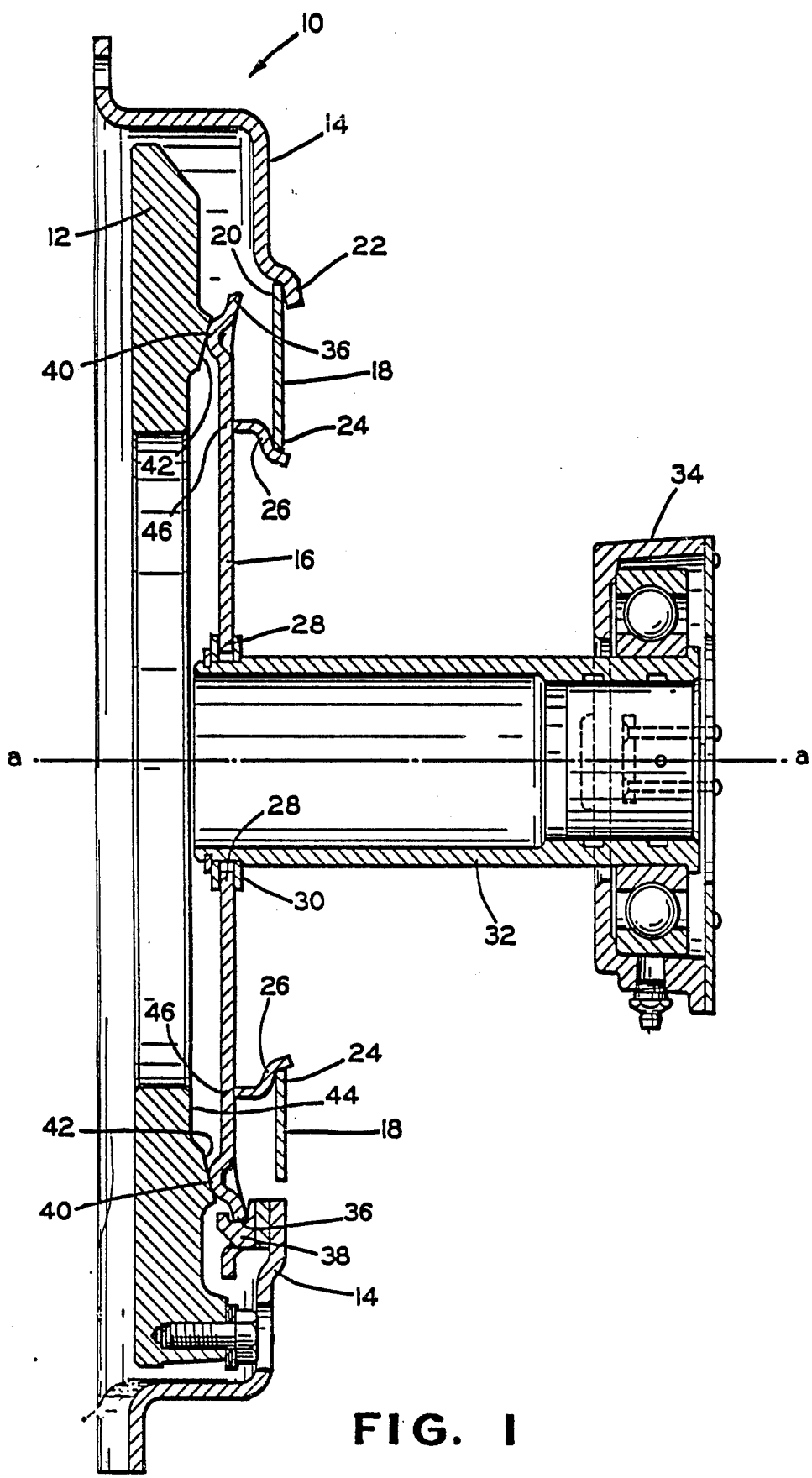
FIG. 1 is a cross sectional view of a preferred embodiment of the angled ring clutch system of the present invention, as shown in a pull-type of clutch.

Referring initially to FIG. 1, a friction disc pull-type clutch is shown. The clutch 10 includes a pressure plate 12 secured to a cover 14 in a manner so as to permit limited axial movement with respect thereto, but permitting no relative rotation between the plate and cover. A plurality of radially disposed clutch release levers 16 are circumferentially spaced about the pressure plate 12 for effecting clutch actuation by axially shifting the pressure plate 12 leftwardly relative to the cover 14 as depicted. Those skilled in the art will appreciate that leftward axial movement of the pressure plate 12 will cause the pressure plate to clampingly engage a friction disc (not shown) against a flywheel (not shown) for purposes of selectively coupling an engine flywheel with an input shaft (neither shown).

Interposed between the levers 16 and the cover 14 is an annular Belleville spring 18, which holds the clutch in a normally engaged position, as will also be appreciated by those skilled in the art. For this purpose, a circumferentially extending outer annular edge portion 20 of the Belleville spring 18 engages a system of detents 22 positioned about the circumference of the cover 14. An inner annular edge portion 24 of the Belleville spring 18 is positioned in continuous engagement with a collector ring 26 which bears against a collector ring contact portion 46 of the levers 16.

The inner ends 28 of the release levers 16 are pivotally supported in an annular release lever coupling 30 which is secured to one end of a release sleeve 32. The release sleeve 32 contains a release bearing 34, which in the pull-type clutch system as depicted must be pulled away from the clutch cover 14 in order to release the clutch levers 16, and to thereby disengage the pressure plate from the friction disc.

In the pull-type clutch 10 of the preferred embodiment, as depicted in FIG. 1, an outer terminal portion 36 of each lever 16 is pivotally supported in a U-shaped channel 38 secured to the cover 14. Thus, the outer terminal portions 36 of the levers are axially fixed, while the inner ends 28 of the release levers will move axially over the greatest lever movement distance. Intermediately positioned of the collector ring contact portions 46 and the outer terminal portions 36 of each lever 16 is an arcuate projection 40 situated so as to contact an inclined surface portion 42 on the back or rearward side 44 of the pressure plate 12. The portion 42 has a planar cross-section as depicted. The angle of the inclined surface portion 42 is such as to produce a multiplier effect in amount of the leverage normally achieved between the lever 16 and the pressure plate 12. For example, it has been determined that a 15 degree angle of the portion 42 on the pressure plate, as preferred, will increase movement of the plate by sixty four percent (64%) per given angle of lever movement. The inclined surface portion 42 of the pressure plate 12 extends angularly outwardly in a direction toward the release bearing 34 as a function of the distance of a point on the surface portion from a central axis a—a of the clutch assembly 10.

It will be appreciated by those skilled in the art that movement of the release bearing 34 rightwardly, or away from the clutch cover 14, will cause the release lever coupling 30 to move rightwardly with the sleeve 32 to which the release bearing 34 and the release lever coupling 30 are rigidly affixed. This action will cause the inner ends 28 of the release levers 16 to pivot rightwardly, which will pull the arcuate projections 40 away from the inclined surface portion 42. Such disengagement movement of the release bearing 34 must be effected against the force of the Belleville spring 18, which normally holds the clutch in an engaged position, or a position in which the arcuate projections 40 are loaded against the inclined surface 42. Hence, the collector ring contact portion 46 of the levers 16 will bear against the collector ring 26, which will in turn bear against the inner annular edge portion 24 of the Belleville spring 18 to overcome the Belleville spring force. Conversely, release of the disengagement load on the release bearing will cause the Belleville spring to resume its normal position as shown in FIG. 1, resulting in a return leftwardly of the release bearing 34, release sleeve 32, and the lever inner ends 28. Upon the latter return movement, the arcuate projections 40 will once again bear against annular inclined surface portion 42.

It will be noted that as described, the nature of the pull-type clutch lever system will be such that the collector ring contact portion 46 of the lever will be urged towards the pressure plate by the Belleville spring 18. Hence the Belleville spring is compressed between the cover and the levers for normally biasing the plurality of levers to cause them to urge the pressure plate into engagement with a friction disc.

Figure 2:
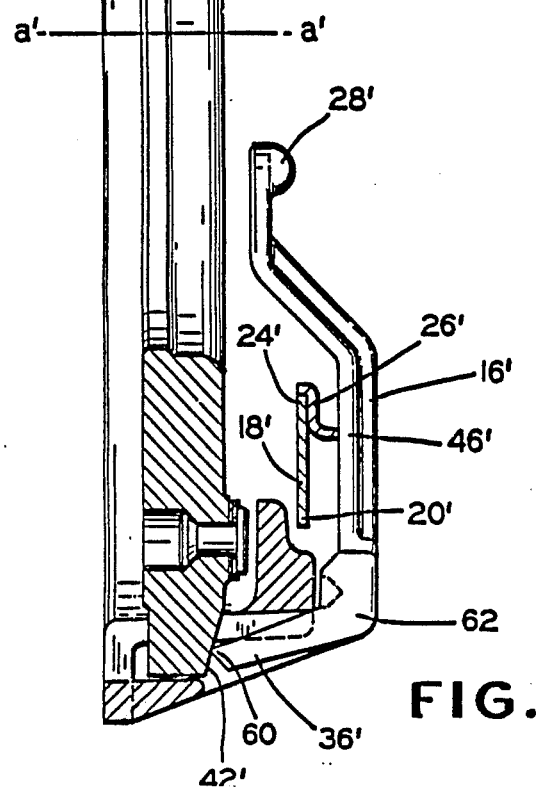
FIG. 2 is a second preferred embodiment of the present invention as employed in a push-type clutch system.

Referring now to FIG. 2, a preferred embodiment of a push-type friction disc clutch assembly 10 is shown. The push-type system contains a plurality of parts analogous to those of the first-described preferred embodiment; namely, a pressure plate 12', a cover 14', a plurality of levers 16', and a Belleville spring 18'. The latter members, however, interact differently as will now be described from the manner in which they operate in the first-described embodiment.

In the push-type clutch system of FIG. 2, it is necessary to move the inner ends 28' of the release levers 16' leftwardly, or toward the pressure plate 12' in order to disengage the normally engaged clutch system 10'. Hence, it will be appreciated that the inward or leftward movement of the inner ends 28' will be effective to cause the collector ring contact portion 46' of the levers 16' to shift the inner annular edge portion 24' of the Belleville spring 18' leftwardly, to overcome such normal engagement force of the Belleville spring 18'.

It will thus be seen that lever contact of the pressure plate 12' is effected through the outer terminal portion 36' of each lever 16' in the push-type embodiment of FIG. 2. In the latter embodiment, the outer terminal portion 36 contains a knife-edge contact 60 which is disposed for engagement of the inclined surface portion 42' of the rear side 44 of the pressure plate 44'. For this purpose, a lever pivot portion 62 is secured to the cover 14', in lieu of the U-shaped channels 38 utilized to pivotally support the movement of the levers 16 of the first-described preferred embodiment. In addition, it will be noted that the inclined surface portion 42' extends angularly inwardly or toward the flywheel as a function of radial distance along the inclined surface from the central axis a'—a'. Thus the inclined surface portion 42' of the push-type clutch has an angle which extends inversely to the angle employed in the pull-type clutch assembly.

Those skilled in the art may now appreciate that providing a Belleville spring-lever contact at the inner annular edge portion 24 will give rise to less lever movement than would the provision of lever interface at the outer annular portion 20. Thus, the combination of using an inclined surface portion 42, 42' along with an inverse Belleville spring 18, 18' will bring about an exponential improvement in reaching an ideal clutch movement, whether or not the clutch is of a push or pull-type. That ideal is (1) the Belleville provides a uniform or constant force loading while minimizing spring movement without sacrifice in spring force, and (2) the leverage at the pressure plate-lever interface achieves a minimal lever movement while effecting a maximal plate travel. The as-described preferred embodiment achieves a clutch system closer to the ideal than any available lever-Belleville spring system known.

Figure 3:
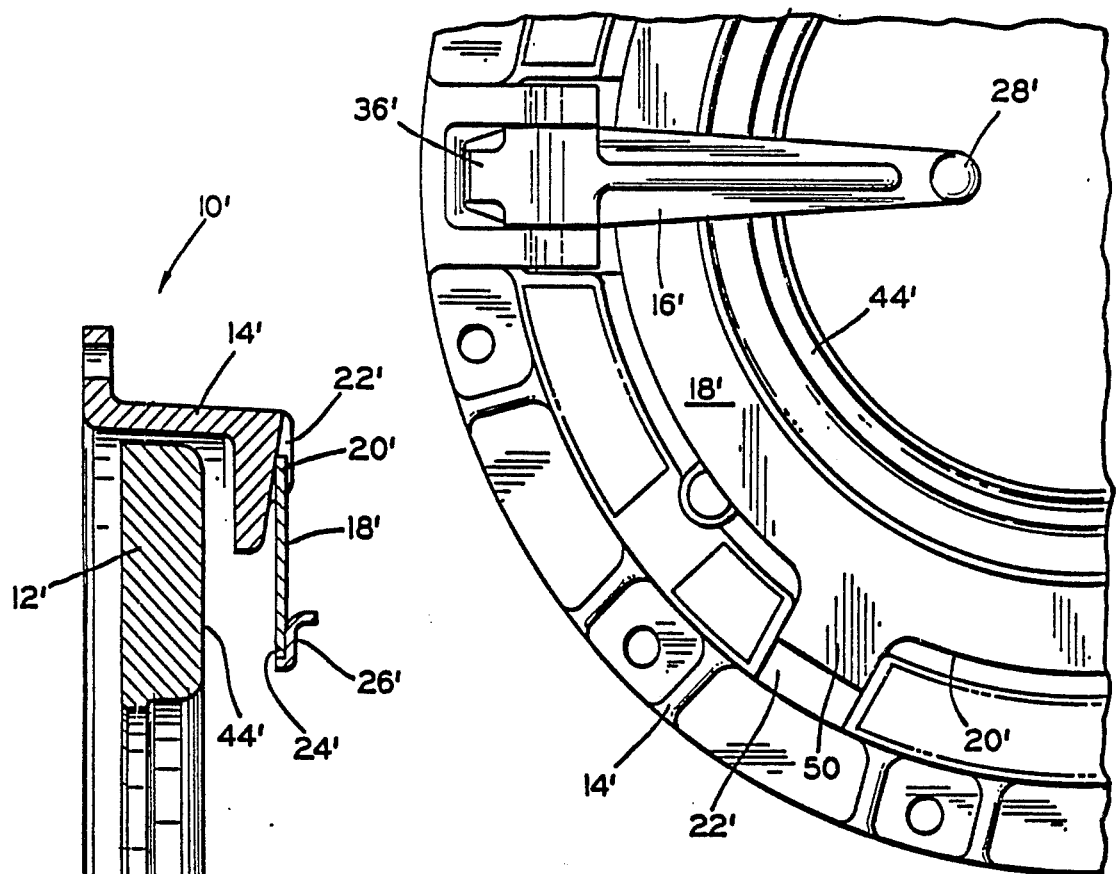
FIG. 3 is a view of the angled release system of the preferred embodiment of FIG. 2 showing the interface between the Belleville spring and the clutch cover.

Referring now to FIG. 3, a view into the rearward or backside 44' of the clutch is provided. It will be appreciated by those skilled in the art that relative movement rotationally between the Belleville spring 18' and the clutch cover 14' is not desirable. Such rotation will, however, tend to occur unless a special provision is made for those members not to move relative to each other. For this purpose, a plurality of radially extending tongues 50 are provided on the outer annular edge portion 20' of the Belleville spring 18' (this feature applies to both preferred embodiments, but is only shown with respect to the second-described preferred embodiment of FIG. 2). The tongues 50 are disposed for engagement in a plurality of U-shaped detents 22' in the cover 14', and will prevent the Belleville spring 18' from rotating with respect to the cover 14'.

Although only two preferred embodiments have been detailed and described herein, the following claims are envisioned to cover a number of other alternatives which will fall within the spirit and scope thereof.

I claim:

1. In a friction clutch system adapted to drivingly engage rotatable drive and driven members comprising an engine flywheel and an input shaft, respectively, said clutch having a central axis about which said flywheel and said driven member are rotatable, said clutch comprising a cover secured to said engine flywheel for rotation therewith, a pressure plate connected to said cover for rotation therewith and for limited axial movement relative to said cover, a plurality of levers pivotally attached to said cover for urging said pressure plate axially relative to said cover into and out of driving engagement with said input shaft, an annular Belleville spring compressed between said cover and said lever for biasing said lever to cause said lever to urge said pressure plate into engagement with said driven member; an improvement comprising said spring having an inner annular edge portion engageable with at least one of said levers and an outer annular edge portion engageable with said cover, in combination with said pressure plate having an annular inclined surface portion for cooperating with said one lever, said surface portion having a planar cross-section, said lever having an arcuate contacting portion for engaging said planar inclined surface portion of said pressure plate, an intermediate portion biased relative to said pressure plate by said annular spring, and an inner end portion connectable to throw out means disposed about said central axis for pivoting said lever to enable said pressure plate to move out of driving engagement with said input shaft, wherein said lever further comprises an outer terminal portion pivotally attached to said cover, said contacting portion positioned adjacent said terminal portion and adapted to contact said inclined surface portion of said pressure plate, said intermediate portion being urged toward said pressure plate by said spring, and wherein said inner end portion is disposed about said central axis for urging said end portion away from said pressure plate to enable said pressure plate to move out of driving engagement with said input shaft, wherein said cover comprises rotational restraint means for said Belleville spring to prevent relative rotation between said cover and said spring, and wherein said spring comprises a plurality of radially outwardly extending tongues for engagement of said rotational restraint means in said cover, wherein said inclined surface portion of said pressure plate extends angularly outwardly in a direction toward said outer terminal portion of said lever as a function of radial distance along said surface of said portion from said central axis.

2. The friction clutch system of claim 1 wherein said outer terminal portion pivotally attached to said cover is contained within an annular channel circumferentially extending about said cover, said channel comprising a U-shaped cross section as viewed along the axial dimension thereof.

3. The friction clutch system of claim 2 further comprising an annular collector ring surrounding said Belleville spring inner peripheral portion, said collector ring engaging and moveable with said lever.

4. The friction clutch system of claim 1 wherein said lever further comprises an outer terminal portion adapted to make sliding contact with said inclined surface portion of said pressure plate, said lever further comprising a support portion pivotally attached to said cover, and wherein said intermediate portion is urged away from said pressure plate by said spring, said support portion being intermediately positioned with respect to said terminal portion in said intermediate portion, and wherein said inner end portion is disposed with respect to said central axis for urging said end portion toward said pressure plate to enable said pressure plate to move out of driving engagement with said input shaft, wherein said outer terminal portion adapted to make sliding contact with said inclined surface portion of said pressure plate comprises a knife-edge contact, wherein said annular inclined surface portion of said pressure plate extends angularly inwardly toward the outer portion of said flywheel as a function of distance of said portion along said surface from said central axis.

5. The friction clutch system of claim 4 wherein said cover comprises a Belleville rotational restraint means to prevent relative rotation between said cover and said spring, said spring comprising a plurality of tongues extending radially outwardly for engagement for said cover restraint means.

6. The friction clutch system of claim 5 wherein said Belleville restraint means of said cover comprise U-shaped detents adapted for receiving said tongues.

7. The friction clutch system of claim 6 further comprising an annular collector ring surrounding said inner peripheral portion of said Belleville spring, said collector ring engaging and moveable with said lever.

* * * * *